(12) United States Patent
McClenahan et al.

(10) Patent No.: US 6,450,333 B1
(45) Date of Patent: Sep. 17, 2002

(54) CARRYING CASE

(75) Inventors: David D. McClenahan, Harleysville, PA (US); James B. Eldon, III, Barto, PA (US); Scott Knorr, Douglassville, PA (US); Frank Knorr, Douglassville, PA (US)

(73) Assignee: Detwiler Industries Incorporated, Morgantown, PA (US)

( * ) Notice: Subject to any disclaimer, the term of this patent is extended or adjusted under 35 U.S.C. 154(b) by 0 days.

(21) Appl. No.: 09/866,098

(22) Filed: May 25, 2001

(51) Int. Cl.[7] .............................................. B65D 85/00
(52) U.S. Cl. ...................... 206/315.11; 206/373; 220/8; 190/104
(58) Field of Search ............................ 206/315.11, 373, 206/349, 372, 1.5; 220/8, 4.21, 4.22, 4.23, 4.24, 843, 844, 848; 190/102, 103, 104, 105, 109

(56) References Cited

U.S. PATENT DOCUMENTS

| | | | | |
|---|---|---|---|---|
| 2,475,961 A | * | 7/1949 | Hilbert | 190/104 |
| 2,650,449 A | | 9/1953 | Suring | |
| 2,724,208 A | * | 11/1955 | Nelson | 206/315.11 |
| 4,170,801 A | * | 10/1979 | Ward | 114/343 |
| 4,715,416 A | * | 12/1987 | Horne | 190/104 |
| 5,005,743 A | * | 4/1991 | Ramsay | 190/104 |
| 5,192,019 A | * | 3/1993 | Meehan | 220/8 |
| 5,425,194 A | * | 6/1995 | Miller | 206/315.11 |
| 5,513,580 A | * | 5/1996 | Franks | 109/51 |
| 5,605,242 A | * | 2/1997 | Hwang | 220/4.03 |
| 5,960,950 A | * | 10/1999 | Meeker et al. | 206/315.11 |
| 6,290,059 B1 | * | 9/2001 | Chuan | 206/238 |

* cited by examiner

*Primary Examiner*—Shian Luong
(74) *Attorney, Agent, or Firm*—Howson & Howson

(57) ABSTRACT

A carrying case has an elongated housing having a central and two end housing structures in overlapping, telescoping relationship so that the length of the carrying case can be adjusted. Hinges are connected to each housing with the hinge axes aligned so that the housings can be jointly rotated between open and closed positions without twisting the housing structures. Hinge alignment is possible by making the leaves of some hinges radially longer than the leaves of other hinges. Interengaging, load-bearing bosses are provided on the housing structures for adjustability to the length of the carrying case while providing strong connections, making it possible to use light weight material. Ribs and buttresses are molded as unitary parts of the central element and have an interengaging feature for reinforcement.

16 Claims, 9 Drawing Sheets

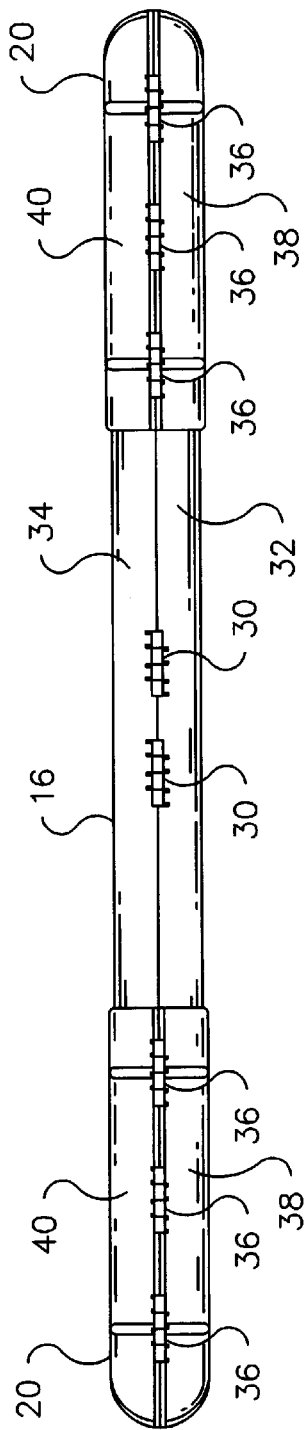
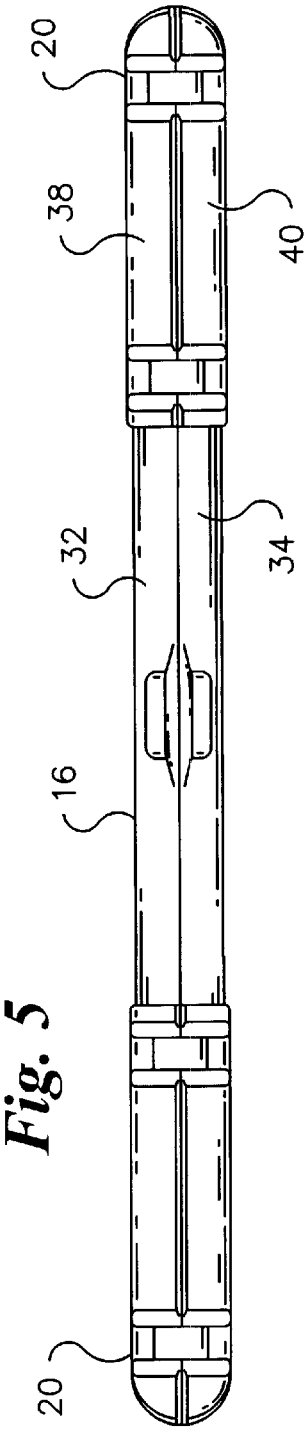

CARRYING CASE

BACKGROUND OF THE INVENTION

This invention relates to carrying cases and, more particularly, to an adjustable carrying case suitable for transporting elongated implements such as fishing rods.

Fishing rod carrying cases are widely used to protect fishing rods during transport and storage, and are commonly seen at airports, as travelers try to protect their rods, reels and fishing accessories from damage in baggage handling.

Several problems are encountered with conventional fishing rod cases. One problem with adjustable fishing rod cases is that longitudinal adjustability is desirable so that the case can properly accommodate either short rods or long rods. However, an adjustable case generally requires stronger, and thus heavier, materials, resulting in an increase in the overall weight of the case.

Additionally, many fishing rod carrying cases have been developed which open only at their ends and require insertion of the fishing rods longitudinally. Insertion in this manner often results in damage to the rod tips and shafts. Though some carrying cases have been designed to open along the longitudinal axis of the case, such cases incorporate fixed hinges and do not allow for adjustment to accommodate rods of different length. Therefore, numerous molds must be made in order to produce cases of varying size, thus increasing the cost of manufacture.

A primary object of this invention is to provide a strong and light weight carrying case, which will protect one or more fishing rods, with reels attached, or other elongated articles and adjust to accommodate articles of various lengths. Another object of the invention is to provide an elongated carrying case that is longitudinally adjustable through a wide range, but which can be opened along its longitudinal axis for easy access to its interior.

SUMMARY OF THE INVENTION

The carrying case in accordance with the invention is preferably in the form of an elongated housing having a first housing structure comprising an elongated central element and a second housing structure comprising two end elements. The end elements are situated at opposite ends of the central element in an overlapping, telescoping relationship with the central element so that the overall length of the carrying case can be adjusted. Each of the central and end elements comprises two molded shell halves with concave interior faces, positionable in opposed relationship to each other.

The carrying case further comprises a first hinge structure which is directly connected to the first housing structure and a second hinge structure directly connected to the second housing structure. The first hinge structure includes a hinge connecting the shell halves of the central element. The second hinge structure includes first and second hinges which connect the shell halves of the two end elements. Each hinge comprises a set of knuckles and two leaves. The leaves project radially with respect to a hinge axis which extends through the knuckles, and are rotatable relative to each other about the hinge axis. The leaves of at least one of the hinge structures are made radially longer than the leaves of the other hinge structures, the relative lengths of the leaves being such that the axes of the hinges are in alignment with one another. With the hinges aligned, the shell halves of the central and end elements can be jointly rotated between opened and closed positions without twisting of the shell halves. Consequently, the shell halves can be molded from light weight materials without making the case susceptible to damage resulting from twisting.

The hinge structure having the radially longer leaves is connected at a location on the elongated housing remote from the ends of the central element so that the length of the housing can be adjusted through a wide range without interference between the hinge structure having the longer leaves and the other hinge structures. In the preferred embodiment of the invention, the end elements telescopically overlap the central element, and the hinge structure connected to the central element contains the radially longer leaves. In an alternative embodiment, the central element telescopically overlaps the two end elements and the hinge structures of the end elements have the longer leaves.

The carrying case further comprises a first series of bosses on each shell half of one of the housing structures. The bosses on this housing structure are uniformly spaced from one another and are situated in a line extending in the direction of elongation. Each boss includes a hollow interior recess which extends perpendicular to the shell half wall. A through hole also extends perpendicularly through each of the bosses.

The carrying case further comprises at least one boss on each shell half of the other housing structure. These bosses include threaded holes alignable with the through holes of the first series of bosses. The bosses are selectably receivable in plural interior recesses of the bosses of the first series. Thus, the overall length of the carrying case can be adjusted to a plurality of discrete lengths by engaging the exterior surface of the boss with the hollow interior wall of one of the bosses of the first series. To secure the engaged bosses, a threaded fastener extending through the through hole of a selected boss on the first housing structure is threaded into a threaded hole of a selected boss on the other housing structure. Attachment of the housing structures in this manner is desirable because the longitudinal load is borne by the bosses instead of the locking screws. The distribution of the longitudinal load by means of the interengaging bosses avoids concentrated loads that would be encountered if the elements were held together only by metal fasteners, and therefore makes it possible to mold the shell halves from light weight materials.

The carrying case further comprises reinforcing ribs molded as a unitary part of the shell half. Each rib extends transverse to the longitudinal direction of the case.

Buttresses, which are also molded as unitary parts of the shell halves, provide additional support to the reinforcement ribs and shell walls, allowing the walls of the shell to be light in weight without sacrificing strength. Each buttress has a first edge meeting the reinforcement rib and a second edge meeting the interior face of the shell half to which it is connected. Each buttress extends longitudinally, and is situated substantially in a plane mutually perpendicular to the reinforcement rib and the interior face of its shell half. Each buttress further includes a notch located at an end of the first edge remote from the interior face of the shell half. The reinforcing ribs of each shell half are longitudinally offset from each other by a short distance so that the ribs of one shell half partially overlap the ribs of the other shell half when the shell halves are positioned in opposed relationship with their concave interior faces facing each other. The offset enables the ribs of one shell half to be received in the notches of the buttresses of the opposing shell half, providing the case with a very high degree of strength and stiffness when closed.

Although a three part carrying case is preferred for optimum length adjustment, a two part case can take advantage of the interengaging bosses and the interlocking ribs and buttresses. Thus, in an alternative embodiment, the carrying case comprises an elongated housing including a first housing structure comprising an elongated element and a second housing structure comprising only one end element situated in an overlapping, telescoping relationship with the elongated element so that the overall length of the carrying case can be adjusted.

Other objects, details and advantages of the invention will be apparent from the following detailed description when read in conjunction with the drawings.

BRIEF BRIEF DESCRIPTION OF THE DRAWINGS

FIG. 4 is a bottom plan view of the fishing rod case in a closed condition;

FIG. 5 is a top plan view of the fishing rod case in a closed condition;

FIG. 6 is a left end elevational view of the fishing rod case in a closed condition, the right end elevational view being a mirror image of the left end elevational view;

Figure 7:
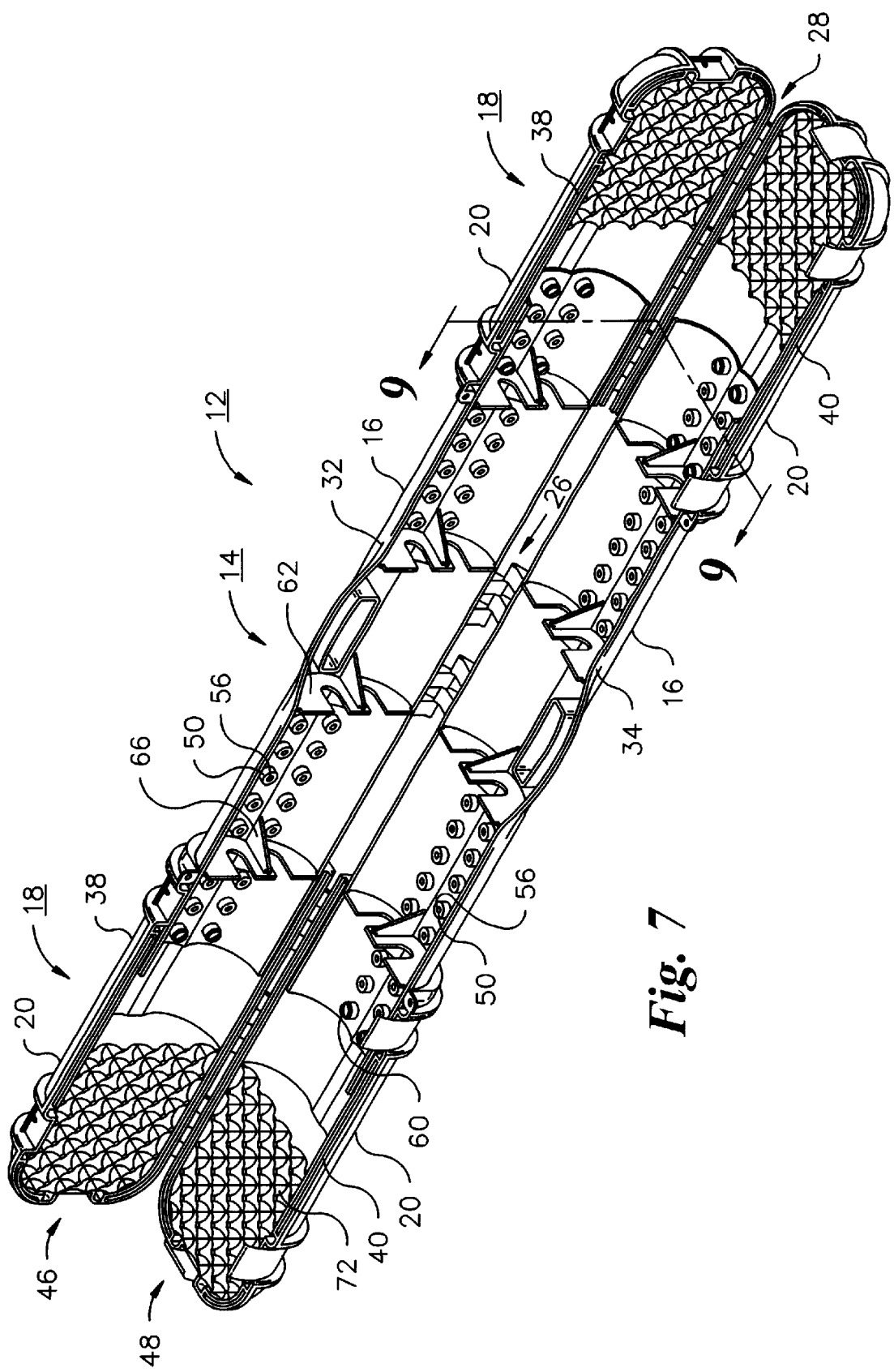
FIG. 7 is perspective view of the fishing rod case in an open condition.
Figure 9:
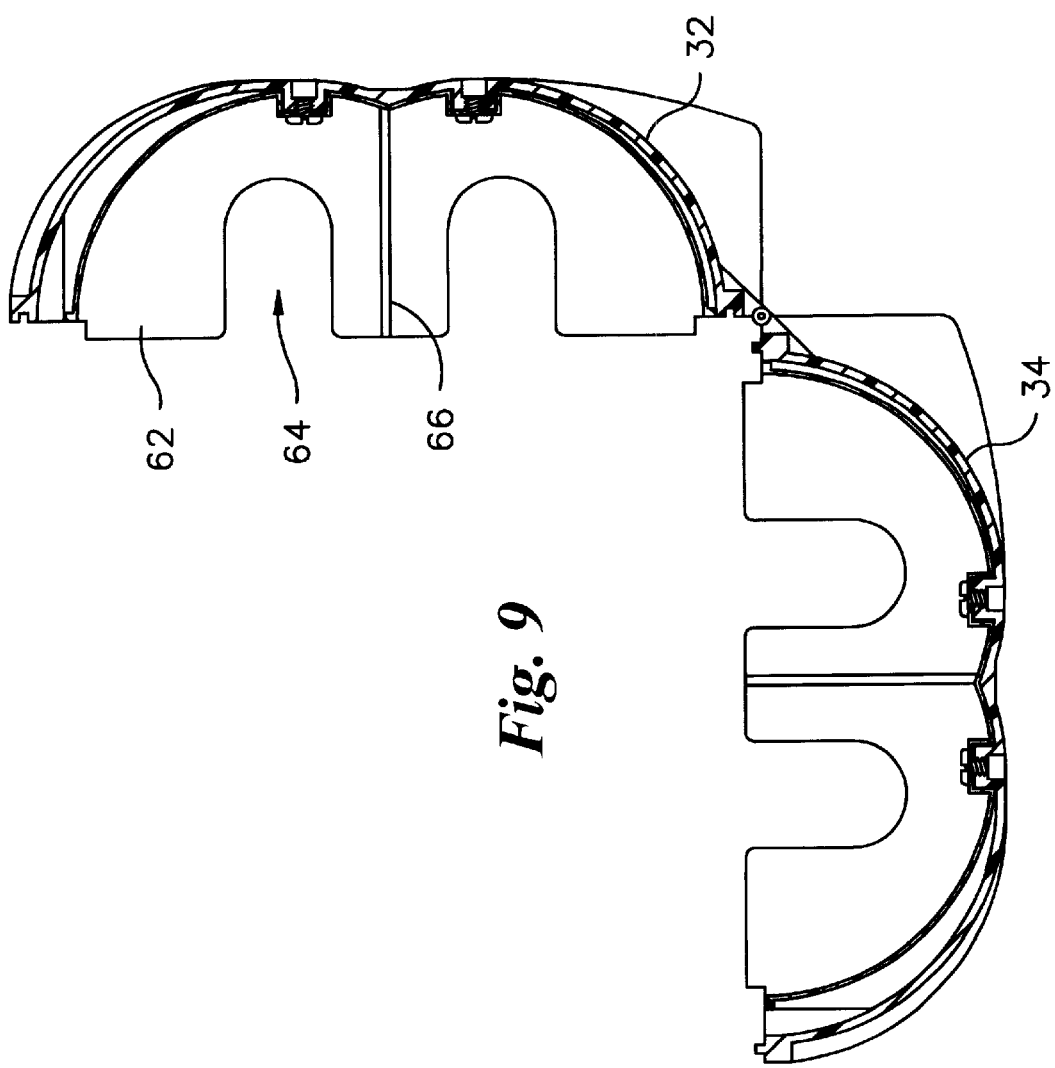
Figure 11:
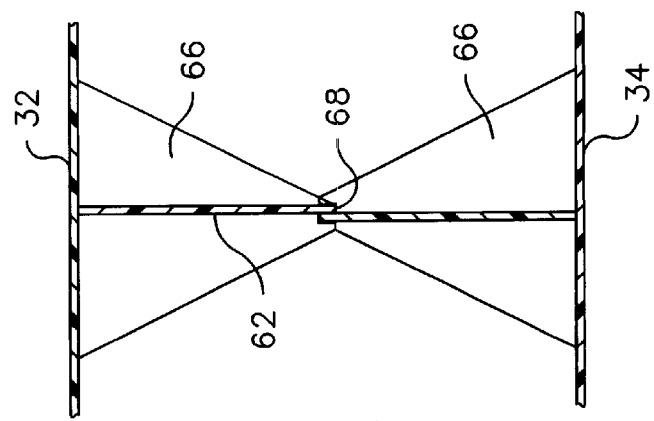
Figure 10:
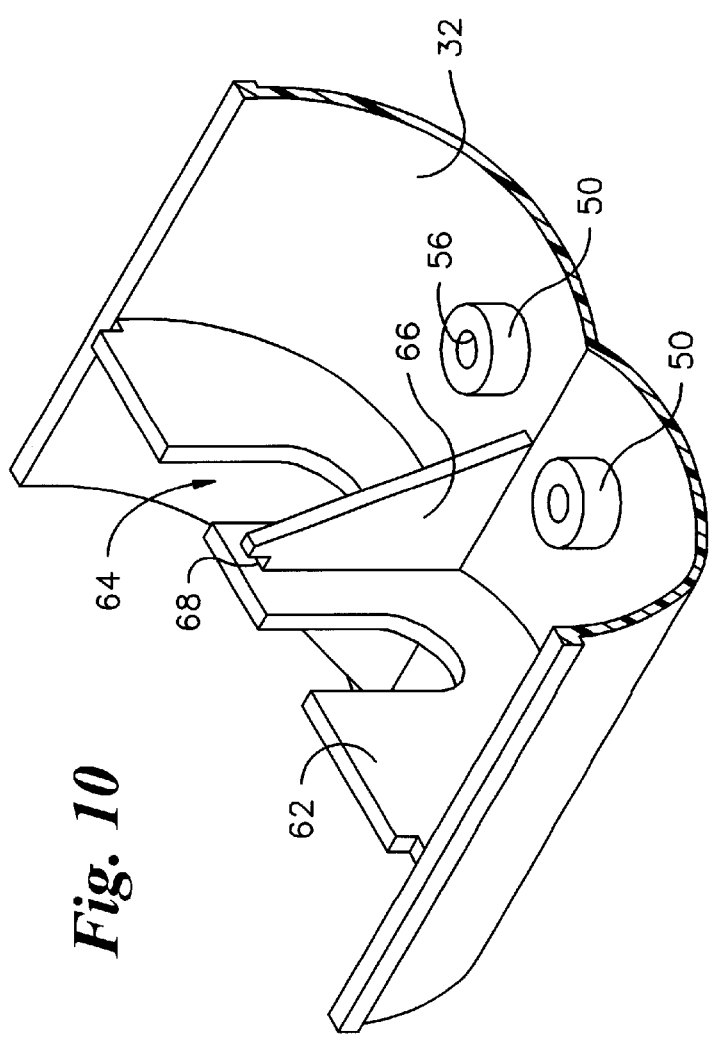
Figure 12:
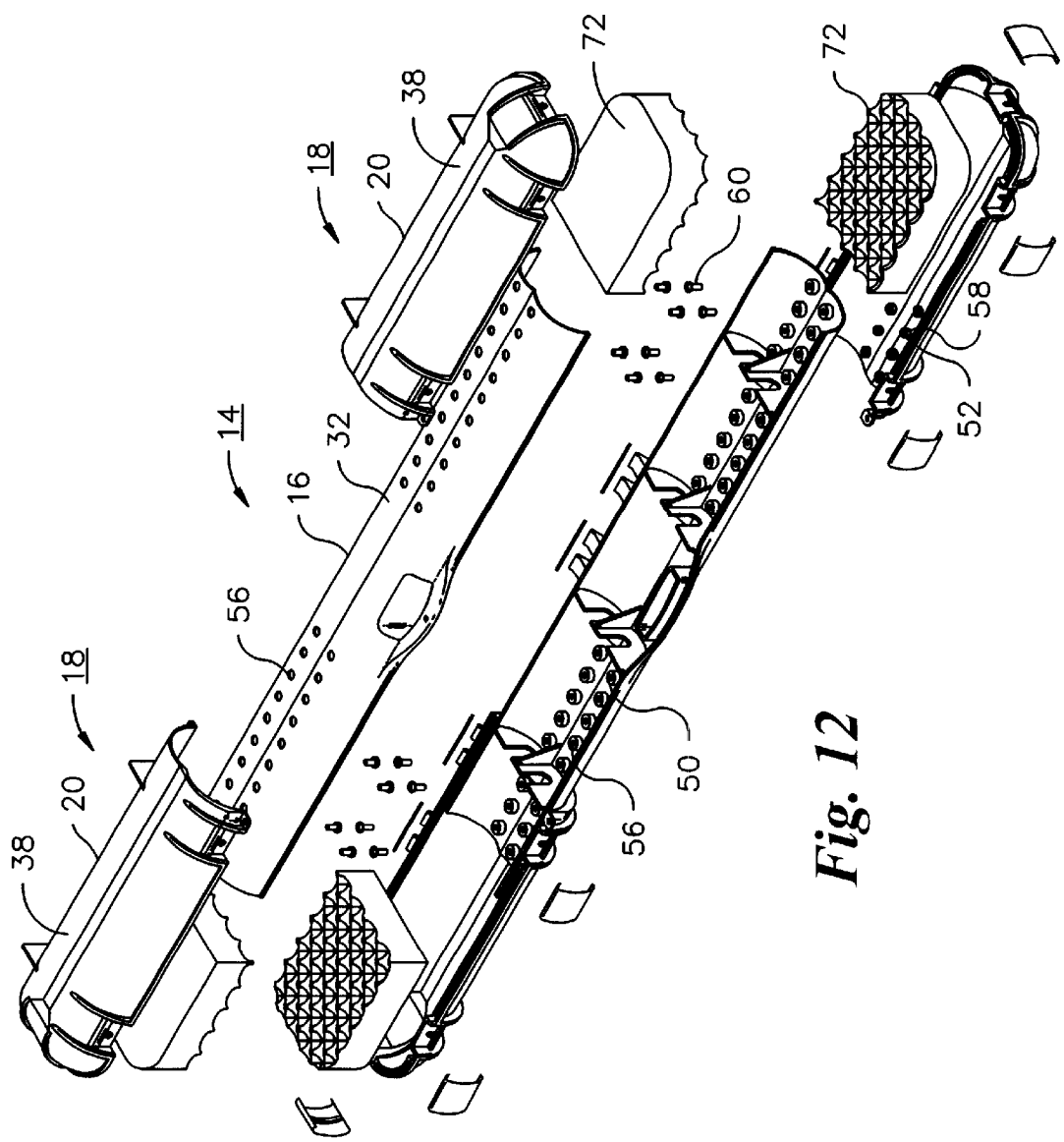
Figure 13:
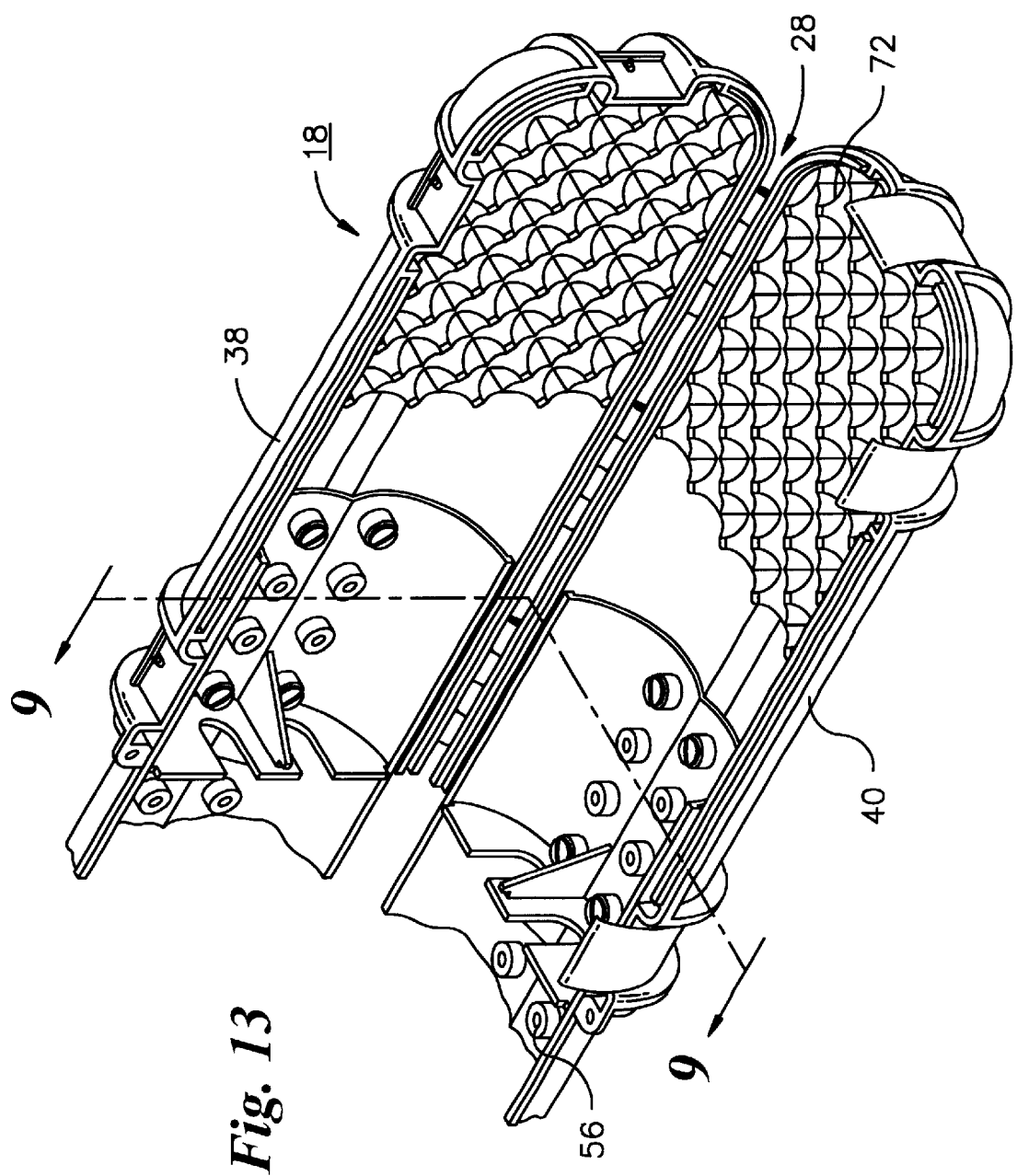
Figure 14:
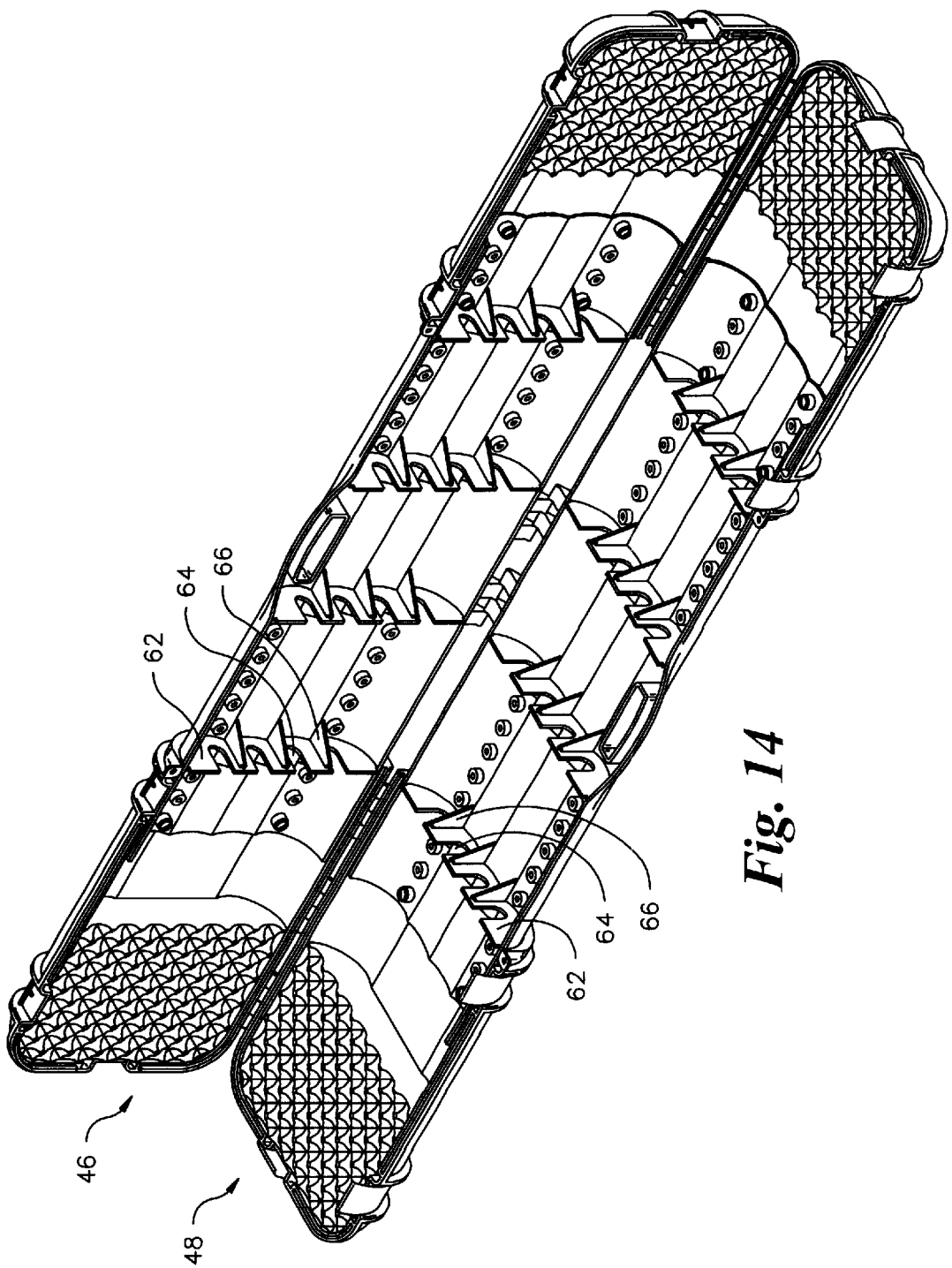

FIG. 9 section view of the fishing rod case taken on plane 9—9 n FIG. 7;

FIG. 10 is a fragmentary perspective view of a shell half of the elongated central element;

FIG. 11 is an enlarged fragmentary section view of the fishing rod case in the closed position;

FIG. 12 is an exploded view of the fishing rod case;

FIG. 13 is an enlarged fragmentary perspective view of the fishing rod case in an open condition; and FIG. 14 is a perspective view of an alternative embodiment of the fishing rod case, having increased capacity.

DETAILED DESCRIPTION OF THE PREFERRED EMBODIMENTS

The preferred embodiments will be described with reference to the drawing figures where like numerals represent like elements throughout.

The carrying case, as shown in FIGS. 1–5, is in the form of an elongated housing 12 consisting of first and second housing structures. The first housing structure 14 comprises an elongated central element 16 and the second housing structure 18 comprises two end elements 20. The end elements 20 are situated at opposite ends of the central element 16 in an overlapping, telescoping relationship with the central element 16 so that the overall length of the carrying case can be adjusted. The central element 16 includes a molded carrying handle 22 with aligned lock-receiving holes, one of which is shown at 24, to permit locking of the carrying case.

Figure 1:
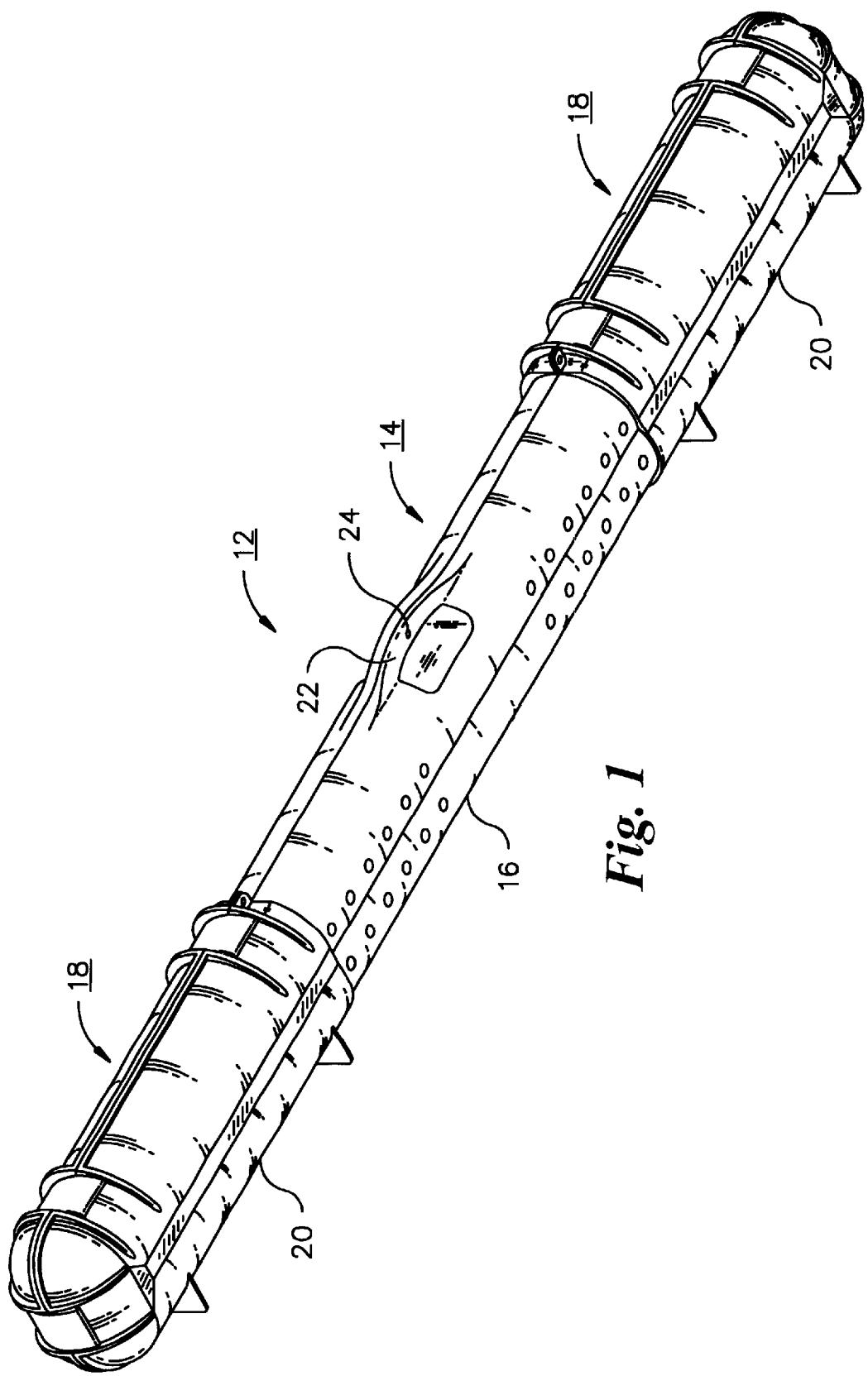
FIG. 1 is a perspective view of the fishing rod case in a closed condition.

The case, which preferably has the general shape illustrated in FIG. 1, can be made from a variety of materials. In the preferred embodiment, the case is formed by molding a synthetic resin such as polypropylene. The molded components should be light in weight and capable of withstanding a wide range in temperature and humidity without cracking, deforming or breaking under impact, or under pressure exerted by adjacent items of baggage.

Figure 2:
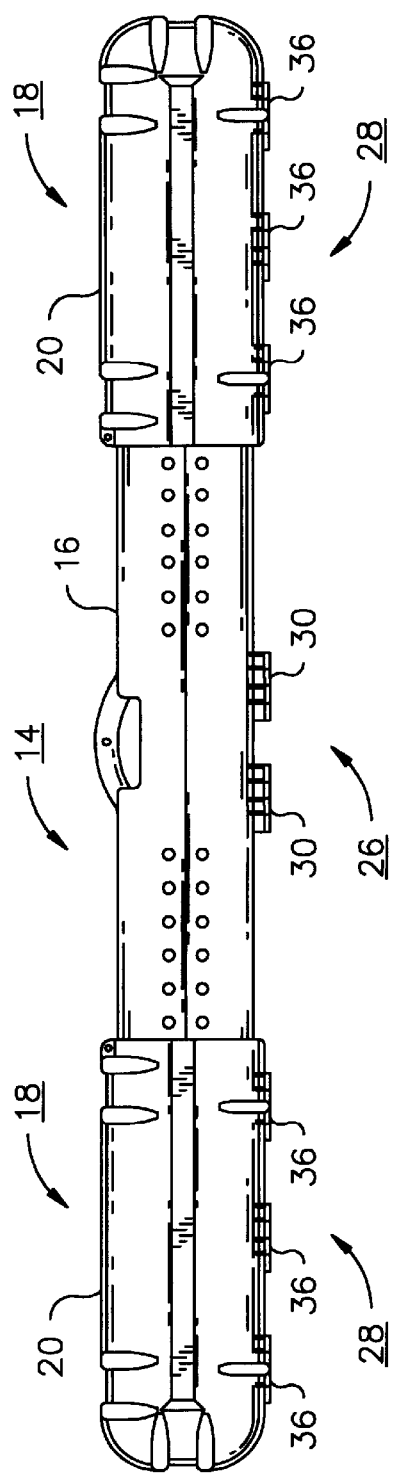
FIG. 2 is a left side elevational view of the fishing rod case in a closed condition, the right side elevational view being a mirror image of the left side elevational view.

As shown in FIGS. 2 and 4, the carrying case further comprises a first hinge structure 26, which is directly connected to the first housing structure 14 and a second hinge structure 28, which is directly connected to the second housing structure 18. The first hinge structure 26 comprises hinges 30 connecting the shell halves 32, 34 of the central element 16. The second hinge structure 28 comprises hinges 36 connecting the shell halves 38, 40 of the two end elements 20.

Figure 3B:
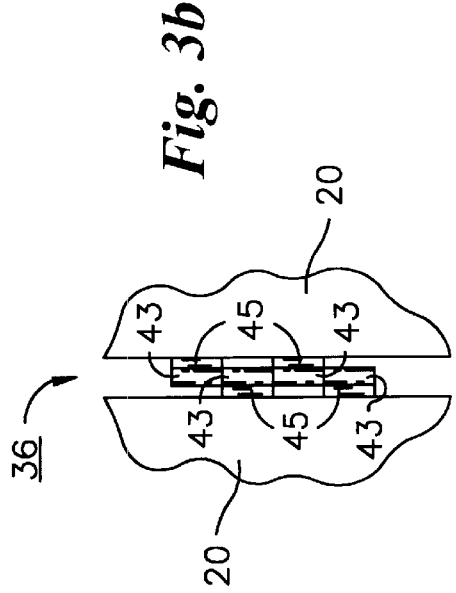
FIG. 3b is an enlarged view of a hinge of the second hinge structure.
Figure 3A:
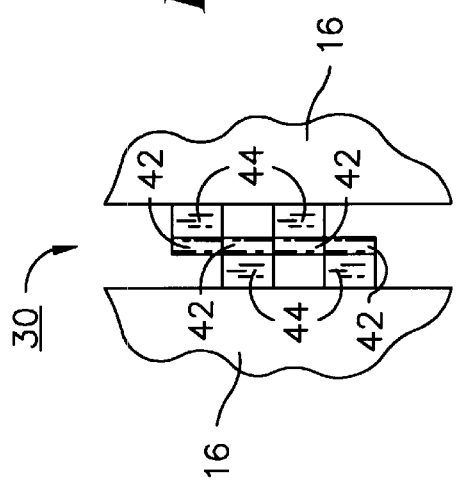
FIG. 3a is an enlarged view of a hinge of the first hinge structure, having elongated leaves.

As shown in FIG. 3a, each hinge 30 of the hinge structure 26 comprises four knuckles 42 and two leaves 44. Each leaf 44 has two parts, each of which is connected to an adjacent knuckle 42. The leaves 44 project radially with respect to a hinge axis extending through the knuckles 42.

As shown in FIG. 3b, each hinge 36 of the hinge structure 28 similarly comprises four knuckles 43 and two leaves 45. Each leaf 45 has two parts, each of which is connected to an adjacent knuckle 43. The leaves 45 project radially with respect to a hinge axis extending through the knuckles 43.

In the preferred embodiment, the leaves 44 of the hinges 30 of the first hinge structure 26 are radially longer than the leaves 45 of the hinges 36 of the second hinge structure 28, the difference in the radial lengths of the leaves being such that the axes of the hinges 30, 36 are in alignment with one another. Thus, the housing structures 14 and 18 are jointly rotatable along a single hinge axis between a closed position as shown in FIG. 1 and an open position as shown in FIG. 7, thereby preventing twisting of the carrying case.

In the preferred embodiment of the invention, as shown in FIGS. 2 and 4, the end elements telescopically overlap the central element, and the hinge structure connected to the central element contains the radially longer leaves. The hinges 30 on the central element 16 are close to each other and are remote from the ends of the central element 16. Locating the hinges 30 remote from the ends of the central element 16 allows the length of the elongated housing 12 to be adjusted through a wide range without interference between the hinges 30 and the end elements 20.

FIG. 7 shows that the first and second opposed parts 46 and 48 of the carrying case are hinged together in clamshell fashion. The first part 46 comprises a shell half 32 of the central element 16 and a shell half 38 of each of the end elements 20. The second part 48 comprises the other shell half 34 of the central element 16 and the other shell halves 40 of the end elements 20. Since the shell halves 32, 34 of the central element 16 are substantially identical elements, and a shell half of each end element 20 on the first part 46 is an element substantially identical to the opposed shell half of the second part 48 at the opposite end of the central element, only three molds are needed to make the carrying case. Thus, the cost of manufacture is minimized. Additionally, each shell half, 38 and 40, may include foam padding 72 lining the interior wall in order to protect rod tips and reels from damage.

Figure 8:
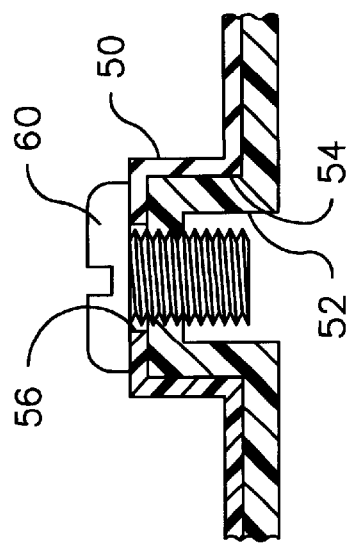
FIG. 8 is enlarged section view of the engaged bosses and locking crew.

In the preferred embodiment, as shown in FIGS. 7 and 10–13, the wall of the first housing structure 14 has eight columns of bosses 50 extending in the direction of elongation of the housing 12. The bosses 50 in each column are uniformly spaced from one another and situated so that adjacent parallel columns form rows of bosses 50. Thus, each row has two bosses 50. As shown in FIG. 8, each boss 50 has a hollow interior recess 54. The recesses all extend toward the interior of the case in a direction perpendicular to the wall. A through hole 56 also extends perpendicularly through each boss 50.

The wall of the second housing structure 18 has eight columns of bosses 52 extending in the direction of elongation of the housing 12. Each end element 20 has four columns. The bosses 52 of each column are uniformly spaced from one another by a distance equal to the spacing of the bosses 50 of the first housing structure 14. As shown in FIG. 8, bosses 52 have threaded holes 58 alignable with the through holes 56 of bosses 50. The overall length of the carrying case can be selectably adjusted by engaging the exterior walls of the bosses 52 of the end elements 20 with the hollow interior recesses 54 of any of the bosses 50 of the central element 16. To secure the case in the desired length, locking screws 60 can be extended through through holes 56 of bosses 50 and threaded into the threaded holes 58 of those bosses 52 that are engaged in the recesses of bosses 50. FIG. 12 further illustrates the columns of bosses 52, with threaded holes 58, of the second housing structure 18, which are aligned with the columns of bosses 50 of the first housing structure 14.

As shown in FIGS. 7 and 12, the first shell half 32 comprises a plurality of reinforcing ribs 62 each molded as a unitary part of the shell half and extending transverse to the longitudinal direction. Formed in each rib 62 are recesses 64 large enough to receive a fishing rod. Shell half 34 has similar ribs. When the shell halves 32, 34 are in the closed position, as shown in FIG. 1, the recesses 64 register with each other to form restraints which hold the rods in place.

The first shell half 32 further includes a plurality of buttresses 66 molded as unitary parts of the shell half 32. The buttresses 66 are situated substantially in a plane mutually perpendicular to the ribs 62 the interior face of the shell half 32 and are molded as unitary parts of the ribs and the shell half. As shown in FIGS. 10 and 11, each buttress 66 has a notch 68 located at the end of the edge of the buttress 66 remote from the interior face of the shell half 32. When the carrying case is in a closed position, the buttresses 66 of the first shell half 32 extend in the longitudinal direction from one side of rib 62, and the buttresses 66 of the second shell half 34 extend in the longitudinal direction from the opposite side of the opposed rib 62. The opposed reinforcing ribs 62 are longitudinally offset from each other by a distance sufficient to enable the opposed ribs 62 to overlap each other partially when the case is in a closed position. This configuration enables the first ribs 62 to be received in the notches 68 of the opposing buttresses 66 so that the rib and buttress structures interlock with each other, thereby providing the case with a high degree of rigidity and strength when closed.

FIG. 14 shows an alternative embodiment of the carrying case capable of handling more fishing rods. Each shell half, 46 and 48, includes ribs 62, each having four recesses 64 and three buttresses 66. Each of the buttresses 66 is positioned between two adjacent recesses 64.

In an alternative embodiment of the invention, the central element can telescopically overlap the two end elements, in which case the hinges of the end elements would have the longer leaves. To achieve maximum adjustability without interference the central element and the hinges of the end elements, the hinges of the end elements would be located near the outer ends of the end elements.

Although a three part carrying case is preferred for optimum length adjustment, a two part carrying case can also take advantage of several of the features of the invention. Thus, in another alternative embodiment, a two part case can include a first housing structure having an elongated element, and a second housing structure, having only one end element. The housings are situated in an overlapping, telescoping relationship with each other. As in the preferred embodiment, the two part case takes advantage of interengaging bosses and interlocking ribs and buttresses for reinforcement.

Still other modifications can be made to the embodiments of the carrying case described. For example, the columns of bosses located on each end element may each include multiple bosses, while each corresponding column of bosses located on the central element includes only a single boss. Thus, adjacent columns of bosses on the central element form only one row. For optimum length adjustment, the bosses on the central element are located near the ends of the central element.

Conversely, the preferred boss configuration can also be modified so that the columns located on the end elements include a single boss while the columns of the central element have multiple bosses. For optimum length adjustment using this configuration, the bosses on the end elements are located near the inner ends of the end elements. In either of the two alternative boss configurations, adjustability is still maximized.

The carrying case can also be modified so that each end element has only one column of bosses on each shell half, in which case, the central element would have a like number of columns on each shell half, alignable with the columns of the end elements.

Still other modifications may be made to the apparatus described above without departing from the scope of the invention as defined in the following claims.

What is claimed is:

1. A carrying case for fishing rods and the like, comprising:

an elongated housing comprising a first housing structure comprising an elongated central element and a second housing structure comprising two end elements, the end elements being situated at opposite ends of the central element and in overlapping, telescoping relationship with the central element so that the overall length of the carrying case can be adjusted, and each of said elements comprising two shell halves, positionable in opposed relationship to each other;

a first hinge structure directly connected to the first housing structure, the first hinge structure comprising a hinge connecting the shell halves of the central element, a second hinge structure directly connected to the second housing structure, the second hinge structure comprising first and second hinges respectively connecting the shell halves of the two end elements, and each hinge comprising knuckles and two leaves, the leaves extending radially with respect to a hinge axis extending through the knuckles and being rotatable relative to each other about said hinge axis, the leaves of at least one of the hinge structures being radially longer than the leaves of the other hinge structure, whereby the axes of the hinges are in alignment with one another, the hinge structure having the radially longer leaves being situated on the shell halves to which it is connected at a location remote from the ends of the central element at least when the overall length of the housing is adjusted to a maximum length, whereby the length of the housing can be adjusted through a wide range without interference between the hinge structure having the radially longer leaves on one of said first and second housing structures, and the other of said first and second housing structures.

2. A carrying case in accordance with claim 1, further comprising:

a first series of bosses on each shell half of one of said first and second housing structures, said bosses being uniformly spaced from one another and situated in a line extending in the direction of elongation of the housing, the bosses of the first series extending in the same direction from one side of a wall of said one of the first and second housing structures, and each of said bosses having a hollow interior recess, open to the opposite side of said wall and a through hole extending through each of said bosses in a direction perpendicular to said wall;

at least one boss on each shell half of the other of said first and second housing structures, said boss having a threaded hole alignable with said through holes, said boss being receivable selectably in plural interior recesses of bosses of the first series, whereby the overall length of the carrying case can be adjusted to any selected one of a plurality of discrete lengths, said boss having an exterior surface engageable with the interior walls of said boss of said first series over areas of contact; and at least one threaded fastener extending through a through hole of a boss of the first series and threaded into a threaded hole of a boss of the other of said housing structures received in the hollow interior recess of said boss of the first series.

3. A carrying case in accordance with claim 2, wherein the bosses on the other of said first and second housing structures are in series.

4. A carrying case in accordance with claim 1, wherein said case is made of rigid material.

5. A carrying case in accordance with claim 4, wherein said rigid material is molded plastics.

6. A carrying case in accordance with claim 1, wherein the hinge structure having the radially longer leaves is said first hinge structure.

7. A carrying case in accordance with claim 1, wherein each of said shell halves includes a concave interior face.

8. A carrying case in accordance with claim 1, including a handle mounted to said elongated central element.

9. A carrying case in accordance with claim 1, wherein said elongate d housing comprises first and second opposed parts hinged together in clamshell fashion, the first part comprising a shell half of the central element and a shell half of each of the end elements, and the second part comprising a shell half of the central element and the other shell halves of the end elements, and wherein the shell halves of the central element are substantially identical, molded elements, and the shell half of each end element on the first part is a molded element substantially identical to the shell half of the second part at the opposite end of the central element.

10. A carrying case for fishing rods and the like, comprising:

a housing elongated in a longitudinal direction, the housing comprising first and second molded, shell halves, each having a concave interior face, and being positionable in opposed relationship with their concave interior faces facing each other;

a hinge structure connecting the shell halves;

a first reinforcing rib molded as a unitary part of the first shell half, the first rib extending transverse to said longitudinal direction;

a second reinforcing rib molded as a unitary part of the second shell half, the second rib extending transverse to said longitudinal direction;

a first buttress molded as a unitary part of the first shell half, and situated substantially in a plane mutually perpendicular to the first rib and a part of the concave interior face of the first shell half, the first buttress having a first edge meeting the first rib and a second edge meeting the first shell half, and having a notch located at an end of said first edge of the first buttress remote from the interior face of the first shell half; and a second buttress molded as a unitary part of the second shell half, and situated substantially in a plane mutually perpendicular to the second rib and a part of the concave interior face of the second shell half, the second buttress having a first edge meeting the second rib and a second edge meeting the second shell half, and having a notch located at an end of said first edge of the second buttress remote from the interior face of the second shell half;

wherein the first buttress extends in the longitudinal direction from a side of the first rib and the second buttress extends in the longitudinal direction from a side of the second rib facing in a direction opposite to side of the first rib, and said first and second reinforcing ribs are longitudinally offset from each other by a distance sufficient to enable the first and second ribs to overlap each other partially when the shell halves are positioned in opposed relationship with their concave interior faces facing each other, and to enable the first rib to be received in the notch of the second buttress and the second rib to be received in the notch of the first buttress.

11. A carrying case in accordance with claim 10, wherein each shell half includes a plurality of spaced reinforcement ribs, and each of said reinforcement ribs includes at least one recess for resting a rod shaft in said recess, whereby an opening for a rod is formed when said shell halves are positioned in opposed relationship with their concave interior faces facing each other.

12. A carrying case in accordance with claim 11, wherein said adjacent recesses have said buttress located there between.

13. A carrying case in accordance with claim 10, wherein said shell halves are made of rigid material.

14. A carrying case in accordance with claim 13, wherein said rigid material is molded plastics.

15. A carrying case for fishing rods and the like, comprising:

an elongated housing comprising a first housing structure comprising an elongated element and a second housing structure comprising at least one end element situated in overlapping, telescoping relationship with the elongated element so that the overall length of the carrying case can be adjusted, and each of said elements comprising two shell halves, positionable in opposed relationship to each other;

a first hinge structure directly connected to the first housing structure, the first hinge structure comprising a hinge connecting the shell halves of the elongated element, a second hinge structure directly connected to the second housing structure, the second hinge structure comprising first and second hinges respectively connecting the shell halves of the two end elements, and each hinge comprising knuckles and two leaves, the leaves extending radially with respect to a hinge axis extending through the knuckles and being rotatable relative to each other about said hinge axis, the leaves of at least one of the hinge structures being radially longer than the leaves of the other-hinge structure, whereby the axes of the hinges are in alignment with one another; and a first series of bosses on one of said first and second housing structures, said bosses being uniformly spaced from one another and situated in a line extending in the direction of elongation of the housing, the bosses of the first series extending in the same direction from one side of a wall of said one of the first and second housing structures, and each of said bosses having a hollow interior recess, open to the opposite side of said wall and a through hole extending through each of said bosses in a direction perpendicular to said wall;

at least one boss on each shell half of the other of said first and second housing structures, said boss having a threaded hole alignable with said through holes, said boss being receivable selectably in plural interior recesses of bosses of the first series, whereby the overall length of the carrying case can be adjusted to any selected one of a plurality of discrete lengths, said boss having an exterior surface engageable with the interior walls of said boss of said first series over areas of contact; and at least one threaded fastener extending through a through hole of a boss of the first series and threaded into a threaded hole of a boss of the other of said housing structures received in the hollow interior recess of said boss of the first series.

16. A carrying case in accordance with claim 15, wherein the bosses on the other of said first and second housing structures are in series.

* * * * *